US010056761B2

United States Patent
Raji et al.

(10) Patent No.: US 10,056,761 B2
(45) Date of Patent: Aug. 21, 2018

(54) POWER AND DATA SOLUTION FOR REMOTE LOW-POWER DEVICES

(71) Applicant: iControl Networks, Inc., Philadelphia, PA (US)

(72) Inventors: Reza Raji, Redwood City, CA (US); Paul Dawes, Redwood City, CA (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

(21) Appl. No.: 14/852,781

(22) Filed: Sep. 14, 2015

(65) Prior Publication Data
US 2016/0233684 A1 Aug. 11, 2016

Related U.S. Application Data

(63) Continuation of application No. 13/099,293, filed on May 2, 2011, now Pat. No. 9,144,143.

(51) Int. Cl.
| | | |
|---|---|---|
| H02J 4/00 | (2006.01) | |
| H05B 37/02 | (2006.01) | |
| H04B 3/54 | (2006.01) | |
| H04L 12/10 | (2006.01) | |

(52) U.S. Cl.
CPC ............... *H02J 4/00* (2013.01); *H04B 3/54* (2013.01); *H04L 12/10* (2013.01); *H05B 37/0263* (2013.01); *H04B 2203/5441* (2013.01); *H04B 2203/5445* (2013.01); *Y10T 307/406* (2015.04)

(58) Field of Classification Search
CPC ........ H05B 37/0263; H04B 2203/5441; H04B 2203/5445; Y10T 307/406
USPC .................................................. 307/155
See application file for complete search history.

(56) References Cited

U.S. PATENT DOCUMENTS

| | | | |
|---|---|---|---|
| 4,754,261 A | 6/1988 | Marino | |
| 4,779,007 A | 10/1988 | Schlanger et al. | |
| 4,833,449 A | 5/1989 | Gaffigan | |
| 4,860,185 A | 8/1989 | Brewer et al. | |
| 4,993,059 A | 2/1991 | Smith et al. | |
| 5,086,385 A | 2/1992 | Launey et al. | |
| 5,519,878 A | 5/1996 | Dolin, Jr. | |

(Continued)

FOREIGN PATENT DOCUMENTS

| | | | |
|---|---|---|---|
| JP | 2003-085258 A | 3/2003 | |
| JP | 2003-141659 A | 5/2003 | |

(Continued)

OTHER PUBLICATIONS

Form PCT/ISA/210, for PCT/US09/53485, "PCT International Search Report," dated Oct. 22, 2009, 2 pgs.

(Continued)

*Primary Examiner* — Robert Deberadinis
(74) *Attorney, Agent, or Firm* — Baker & Hostetler LLP (57) ABSTRACT

Systems and methods include a voltage transformer connected to a power source. The voltage transformer transforms a high voltage of the power source to a first low voltage signal. Regulators are connected to the voltage transformer, and the regulators receive the first low voltage signal from the voltage transformer and convert the first low voltage signal to a second low voltage signal. A remote device is connected to each of the regulators. The remote device is powered by the second low voltage signal from the regulator to which it is connected.

21 Claims, 4 Drawing Sheets

(56) References Cited

U.S. PATENT DOCUMENTS

| | | |
|---|---|---|
| 5,579,197 A | 11/1996 | Mengelt et al. |
| 5,907,279 A | 5/1999 | Bruins et al. |
| 5,963,916 A | 10/1999 | Kaplan |
| D416,910 S | 11/1999 | Vasquez |
| 5,991,795 A | 11/1999 | Howard et al. |
| 6,037,991 A | 3/2000 | Thro et al. |
| 6,052,052 A | 4/2000 | Delmonaco |
| 6,060,994 A | 5/2000 | Chen |
| 6,134,591 A | 10/2000 | Nickles |
| 6,140,987 A | 10/2000 | Stein et al. |
| 6,198,475 B1 | 3/2001 | Kunimatsu et al. |
| 6,198,479 B1 | 3/2001 | Humpleman et al. |
| 6,219,677 B1 | 4/2001 | Howard |
| 6,281,790 B1 | 8/2001 | Kimmel et al. |
| 6,286,038 B1 | 9/2001 | Reichmeyer et al. |
| 6,288,716 B1 | 9/2001 | Humpleman et al. |
| D451,529 S | 12/2001 | Vasquez |
| 6,331,122 B1 | 12/2001 | Wu |
| 6,351,829 B1 | 2/2002 | Dupont et al. |
| 6,353,891 B1 | 3/2002 | Borella et al. |
| 6,363,417 B1 | 3/2002 | Howard et al. |
| 6,370,436 B1 | 4/2002 | Howard et al. |
| 6,377,861 B1 | 4/2002 | York |
| 6,385,772 B1 | 5/2002 | Courtney |
| 6,400,265 B1 | 6/2002 | Saylor et al. |
| 6,418,037 B1 | 7/2002 | Zhang |
| D464,328 S | 10/2002 | Vasquez et al. |
| D464,948 S | 10/2002 | Vasquez et al. |
| 6,462,507 B2 | 10/2002 | Fisher, Jr. |
| 6,462,663 B1 | 10/2002 | Wilson et al. |
| 6,467,084 B1 | 10/2002 | Howard et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,529,723 B1 | 3/2003 | Bentley |
| 6,542,075 B2 | 4/2003 | Barker et al. |
| 6,563,800 B1 | 5/2003 | Salo et al. |
| 6,574,234 B1 | 6/2003 | Myer et al. |
| 6,580,950 B1 | 6/2003 | Johnson et al. |
| 6,587,736 B2 | 7/2003 | Howard et al. |
| 6,591,094 B1 | 7/2003 | Bentley |
| 6,601,086 B1 | 7/2003 | Howard et al. |
| 6,609,127 B1 | 8/2003 | Lee et al. |
| 6,615,088 B1 | 9/2003 | Myer et al. |
| 6,621,827 B1 | 9/2003 | Rezvani et al. |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,686,838 B1 | 2/2004 | Rezvani et al. |
| 6,690,411 B2 | 2/2004 | Naidoo et al. |
| 6,693,545 B2 | 2/2004 | Brown et al. |
| 6,721,689 B2 | 4/2004 | Markle et al. |
| 6,721,747 B2 | 4/2004 | Lipkin |
| 6,738,824 B1 | 5/2004 | Blair |
| 6,756,998 B1 | 6/2004 | Bilger |
| 6,778,085 B2 | 8/2004 | Faulkner et al. |
| 6,781,509 B1 | 8/2004 | Oppedahl et al. |
| 6,789,147 B1 | 9/2004 | Kessler et al. |
| 6,795,322 B2 | 9/2004 | Aihara et al. |
| 6,798,344 B2 | 9/2004 | Faulkner et al. |
| 6,826,233 B1 | 11/2004 | Oosawa |
| 6,865,690 B2 | 3/2005 | Kocin |
| 6,891,838 B1 | 5/2005 | Petite et al. |
| 6,912,429 B1 | 6/2005 | Bilger |
| 6,928,148 B2 | 8/2005 | Simon et al. |
| 6,930,599 B2 | 8/2005 | Naidoo et al. |
| 6,930,730 B2 | 8/2005 | Maxon et al. |
| 6,931,445 B2 | 8/2005 | Davis |
| 6,943,681 B2 | 9/2005 | Rezvani et al. |
| 6,959,393 B2 | 10/2005 | Hollis et al. |
| 6,965,313 B1 | 11/2005 | Saylor et al. |
| 6,970,183 B1 | 11/2005 | Monroe |
| 6,972,676 B1 | 12/2005 | Kimmel et al. |
| 6,975,220 B1 | 12/2005 | Foodman et al. |
| 6,990,591 B1 | 1/2006 | Pearson |
| 7,016,970 B2 | 3/2006 | Harumoto et al. |
| 7,024,676 B1 | 4/2006 | Klopfenstein |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,039,391 B2 | 5/2006 | Rezvani et al. |
| 7,047,088 B2 | 5/2006 | Nakamura et al. |
| 7,047,092 B2 | 5/2006 | Wimsatt |
| 7,072,934 B2 | 7/2006 | Helgeson et al. |
| 7,079,020 B2 | 7/2006 | Stilp |
| 7,080,046 B1 | 7/2006 | Rezvani et al. |
| 7,085,937 B1 | 8/2006 | Rezvani et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,113,090 B1 | 9/2006 | Saylor et al. |
| 7,113,099 B2 | 9/2006 | Tyroler et al. |
| 7,120,232 B2 | 10/2006 | Naidoo et al. |
| 7,120,233 B2 | 10/2006 | Naidoo et al. |
| 7,130,383 B2 | 10/2006 | Naidoo et al. |
| 7,130,585 B1 | 10/2006 | Ollis et al. |
| 7,148,810 B2 | 12/2006 | Bhat |
| 7,149,798 B2 | 12/2006 | Rezvani et al. |
| 7,164,907 B2 | 1/2007 | Cochran et al. |
| 7,174,564 B1 | 2/2007 | Weatherspoon et al. |
| 7,183,907 B2 | 2/2007 | Simon et al. |
| 7,203,486 B2 | 4/2007 | Patel |
| 7,218,217 B2 | 5/2007 | Adonailo et al. |
| 7,222,359 B2 | 5/2007 | Freund et al. |
| 7,237,267 B2 | 6/2007 | Rayes et al. |
| 7,250,854 B2 | 7/2007 | Rezvani et al. |
| 7,254,779 B1 | 8/2007 | Rezvani et al. |
| 7,262,690 B2 | 8/2007 | Heaton et al. |
| 7,305,461 B2 | 12/2007 | Ullman |
| 7,337,217 B2 | 2/2008 | Wang |
| 7,337,473 B2 | 2/2008 | Chang et al. |
| 7,343,619 B2 | 3/2008 | Ofek et al. |
| 7,349,761 B1 | 3/2008 | Cruse |
| 7,349,967 B2 | 3/2008 | Wang |
| 7,367,045 B2 | 4/2008 | Ofek et al. |
| 7,370,115 B2 | 5/2008 | Bae et al. |
| 7,383,339 B1 | 6/2008 | Meenan et al. |
| 7,403,838 B2 | 7/2008 | Deen et al. |
| 7,409,451 B1 | 8/2008 | Meenan et al. |
| 7,428,585 B1 | 9/2008 | Owens, II et al. |
| 7,430,614 B2 | 9/2008 | Shen et al. |
| 7,440,434 B2 | 10/2008 | Chaskar et al. |
| 7,457,869 B2 | 11/2008 | Kernan |
| 7,469,139 B2 | 12/2008 | van de Groenendaal |
| 7,469,294 B1 | 12/2008 | Luo et al. |
| 7,480,713 B2 | 1/2009 | Ullman |
| 7,480,724 B2 | 1/2009 | Zimler et al. |
| 7,498,695 B2 | 3/2009 | Gaudreau et al. |
| 7,506,052 B2 | 3/2009 | Qian et al. |
| 7,509,687 B2 | 3/2009 | Ofek et al. |
| 7,526,762 B1 | 4/2009 | Astala et al. |
| 7,551,071 B2 | 6/2009 | Bennett, III et al. |
| 7,558,379 B2 | 7/2009 | Winick |
| 7,577,420 B2 | 8/2009 | Srinivasan et al. |
| 7,587,464 B2 | 9/2009 | Moorer et al. |
| 7,627,665 B2 | 12/2009 | Barker et al. |
| 7,634,519 B2 | 12/2009 | Creamer et al. |
| 9,144,143 B2 * | 9/2015 | Raji ............... H05B 37/0263 |
| 2001/0016501 A1 | 8/2001 | King |
| 2001/0034754 A1 | 10/2001 | Elwahab et al. |
| 2002/0004828 A1 | 1/2002 | Davis et al. |
| 2002/0026476 A1 | 2/2002 | Miyazaki et al. |
| 2002/0029276 A1 | 3/2002 | Bendinelli et al. |
| 2002/0038380 A1 | 3/2002 | Brawn et al. |
| 2002/0052913 A1 | 5/2002 | Yamada et al. |
| 2002/0083342 A1 | 6/2002 | Webb et al. |
| 2002/0095490 A1 | 7/2002 | Barker et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0111698 A1 | 8/2002 | Graziano et al. |
| 2002/0112051 A1 | 8/2002 | Ullman |

(56) References Cited

U.S. PATENT DOCUMENTS

| | | |
|---|---|---|
| 2002/0112182 A1 | 8/2002 | Chang et al. |
| 2002/0143923 A1 | 10/2002 | Alexander |
| 2002/0156564 A1 | 10/2002 | Preston et al. |
| 2002/0180579 A1 | 12/2002 | Nagaoka et al. |
| 2002/0184301 A1 | 12/2002 | Parent |
| 2003/0009552 A1 | 1/2003 | Benfield et al. |
| 2003/0009553 A1 | 1/2003 | Benfield et al. |
| 2003/0041167 A1 | 2/2003 | French et al. |
| 2003/0051009 A1 | 3/2003 | Shah et al. |
| 2003/0052923 A1 | 3/2003 | Porter |
| 2003/0062997 A1 | 4/2003 | Naidoo et al. |
| 2003/0090473 A1 | 5/2003 | Joshi |
| 2003/0115345 A1 | 6/2003 | Chien et al. |
| 2003/0132018 A1 | 7/2003 | Okita et al. |
| 2003/0174648 A1 | 9/2003 | Wang et al. |
| 2003/0187920 A1 | 10/2003 | Redkar |
| 2003/0210126 A1 | 11/2003 | Kanazawa |
| 2003/0230934 A1 | 12/2003 | Cordelli et al. |
| 2003/0236841 A1 | 12/2003 | Epshteyn |
| 2004/0003241 A1 | 1/2004 | Sengodan et al. |
| 2004/0015572 A1 | 1/2004 | Kang |
| 2004/0037295 A1 | 2/2004 | Tanaka et al. |
| 2004/0054789 A1 | 3/2004 | Breh et al. |
| 2004/0086088 A1 | 5/2004 | Naidoo et al. |
| 2004/0123149 A1 | 6/2004 | Tyroler |
| 2004/0139227 A1 | 7/2004 | Takeda |
| 2004/0162902 A1 | 8/2004 | Davis |
| 2004/0177163 A1 | 9/2004 | Casey et al. |
| 2004/0243835 A1 | 12/2004 | Terzis et al. |
| 2004/0267937 A1 | 12/2004 | Klemets |
| 2005/0015805 A1 | 1/2005 | Iwamura |
| 2005/0038326 A1 | 2/2005 | Mathur |
| 2005/0066045 A1 | 3/2005 | Johnson et al. |
| 2005/0069098 A1 | 3/2005 | Kalervo et al. |
| 2005/0079855 A1 | 4/2005 | Jethi et al. |
| 2005/0086126 A1 | 4/2005 | Patterson |
| 2005/0108091 A1 | 5/2005 | Sotak et al. |
| 2005/0108369 A1 | 5/2005 | Sather et al. |
| 2005/0125083 A1 | 6/2005 | Kiko |
| 2005/0128083 A1 | 6/2005 | Puzio et al. |
| 2005/0149639 A1 | 7/2005 | Vrielink et al. |
| 2005/0169288 A1 | 8/2005 | Kamiwada et al. |
| 2005/0197847 A1 | 9/2005 | Smith |
| 2005/0216302 A1 | 9/2005 | Raji et al. |
| 2005/0216580 A1 | 9/2005 | Raji et al. |
| 2005/0222820 A1 | 10/2005 | Chung |
| 2005/0231349 A1 | 10/2005 | Bhat |
| 2005/0280964 A1 | 12/2005 | Richmond et al. |
| 2006/0009863 A1 | 1/2006 | Lingemann |
| 2006/0088092 A1 | 4/2006 | Chen et al. |
| 2006/0105713 A1 | 5/2006 | Zheng et al. |
| 2006/0111095 A1 | 5/2006 | Weigand |
| 2006/0181406 A1 | 8/2006 | Petite et al. |
| 2006/0182100 A1 | 8/2006 | Li et al. |
| 2006/0187900 A1 | 8/2006 | Akbar |
| 2006/0200845 A1 | 9/2006 | Foster et al. |
| 2006/0206220 A1 | 9/2006 | Amundson |
| 2006/0209857 A1 | 9/2006 | Hicks |
| 2006/0222153 A1 | 10/2006 | Tarkoff et al. |
| 2006/0271695 A1 | 11/2006 | Lavian |
| 2006/0282886 A1 | 12/2006 | Gaug |
| 2007/0052675 A1 | 3/2007 | Chang |
| 2007/0061266 A1 | 3/2007 | Moore et al. |
| 2007/0106124 A1 | 5/2007 | Kuriyama et al. |
| 2007/0142022 A1 | 6/2007 | Madonna et al. |
| 2007/0256105 A1 | 11/2007 | Tabe |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0298772 A1 | 12/2007 | Owens et al. |
| 2008/0042826 A1 | 2/2008 | Hevia et al. |
| 2008/0065681 A1 | 3/2008 | Fontijn et al. |
| 2008/0084296 A1 | 4/2008 | Kutzik et al. |
| 2008/0147834 A1 | 6/2008 | Quinn et al. |
| 2008/0180240 A1 | 7/2008 | Raji et al. |
| 2008/0183842 A1 | 7/2008 | Raji et al. |
| 2008/0235326 A1 | 9/2008 | Parsi et al. |
| 2009/0070436 A1 | 3/2009 | Dawes et al. |
| 2009/0165114 A1 | 6/2009 | Baum et al. |
| 2009/0177906 A1 | 7/2009 | Paniagua et al. |
| 2009/0204693 A1 | 8/2009 | Andreev et al. |
| 2009/0240787 A1 | 9/2009 | Denny |
| 2009/0240814 A1 | 9/2009 | Brubacher et al. |
| 2010/0052612 A1 | 3/2010 | Raji et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0332164 A1 | 12/2010 | Aisa et al. |

FOREIGN PATENT DOCUMENTS

| | | |
|---|---|---|
| JP | 2004-192659 A | 7/2004 |
| KR | 20060021605 | 3/2006 |
| WO | WO 89/07855 | 8/1989 |
| WO | WO 2001/052478 | 7/2001 |
| WO | WO 2001/099078 | 12/2001 |
| WO | WO 2004/004222 | 1/2004 |
| WO | WO 2004/107710 | 12/2004 |
| WO | WO 2005/091218 A2 | 9/2005 |
| WO | WO 2005/091218 A3 | 7/2006 |
| WO | 2009/145747 A1 | 12/2009 |
| WO | 2011/137458 | 11/2011 |

OTHER PUBLICATIONS

Form PCT/ISA/210, for PCT/US09/55559, "PCT International Search Report," dated Nov. 12, 2009, 2 pgs.

Form PCT/ISA/210, for PCT/US10/50585, "PCT International Search Report," dated Dec. 30, 2010, 2 pgs.

Form PCT/ISA/210, for PCT/US10/57674, "PCT International Search Report," dated Mar. 2, 2011, 2 pgs.

PCT/US05/08766, PCT International Search Report, Form PCT/ISA/210, dated May 23, 2006, 2 pgs.

Form PCT/ISA/220, For PCT/US09/53485, "PCT Notification of Transmittal of The International Search Report and the Written Opinion of the International Searching Authority, or the Declaration," dated Oct. 22, 2009, 1 pg.

Form PCT/ISA/220, For PCT/US09/55559, "PCT Notification of Transmittal of The International Search Report and the Written Opinion of the International Searching Authority, or the Declaration," dated Nov. 12, 2009, 1 pg.

Form PCT/ISA/220, For PCT/US10/50585, "PCT Notification of Transmittal of The International Search Report and the Written Opinion of the International Searching Authority, or the Declaration," dated Dec. 30, 2010, 1 pg.

Form PCT/ISA/220, For PCT/US10/57674, "PCT Notification of Transmittal of The International Search Report and the Written Opinion of the International Searching Authority, or the Declaration," dated Mar. 2, 2011, 1 pg.

Form PCT/ISA/220, For PCT/US05/08766, "PCT Notification of Transmittal of The International Search Report and the Written Opinion of the International Searching Authority, or the Declaration," dated May 23, 2006, 1 pg.

Form PCT/ISA/237, For PCT/US09/53485, "PCT Written Opinion of the International Searching Authority," dated Oct. 22, 2009, 8 pgs.

Form PCT/ISA/237, For PCT/US09/55559, "PCT Written Opinion of the International Searching Authority," dated Nov. 12, 2009, 6 pgs.

Form PCT/ISA/237, For PCT/US10/50585, "PCT Written Opinion of the International Searching Authority," dated Dec. 30, 2010, 7 pgs.

Form PCT/ISA/237, For PCT/US10/57674, "PCT Written Opinion of the International Searching Authority," dated Mar. 2, 2011, 6 pgs.

Form PCT/ISA/237, For PCT/US05/08766, "PCT Written Opinion of the International Searching Authority," dated May 23, 2006, 5 pgs.

Form PCT/ISA/210, For PCT/US08/72831, "PCT International Search Report," dated Nov. 4, 2008, 2 pgs.

(56) References Cited

OTHER PUBLICATIONS

Form PCT/ISA/210, For PCT/US08/74246, "PCT International Search Report," dated Nov. 14, 2008, 2 pgs.
Form PCT/ISA/210, For PCT/US08/74260, "PCT International Search Report," dated Nov. 3, 2008, 2 pgs.
Form PCT/ISA/210, For PCT/US08/83254, "PCT International Search Report," dated Jan. 14, 2009, 2 pgs.
Form PCT/ISA/220, For PCT/US08/72831, "PCT Notification of Transmittal of The International Search Report and the Written Opinion of the International Searching Authority, or the Declaration," dated Nov. 4, 2008, 1 pg.
Form PCT/ISA/220, For PCT/US08/74246, "PCT Notification of Transmittal of The International Search Report and the Written Opinion of the International Searching Authority, or the Declaration," dated Nov. 14, 2008, 1 pg.
Form PCT/ISA/220, For PCT/US08/74260, "PCT Notification of Transmittal of The International Search Report and the Written Opinion of the International Searching Authority, or the Declaration," dated Nov. 13, 2008, 1 pg.
Form PCT/ISA/220, For PCT/US08/83254, "PCT Notification of Transmittal of The International Search Report and the Written Opinion of the International Searching Authority, or the Declaration," dated Jan. 14, 2009, 1 pg.
Form PCT/ISA/237, For PCT/US08/72831, "PCT Written Opinion of the International Searching Authority," dated Nov. 4, 2008, 6 pgs.
Form PCT/ISA/237, For PCT/US08/74246, "PCT Written Opinion of the International Searching Authority," dated Nov. 14, 2008, 6 pgs.
Form PCT/ISA/237, For PCT/US08/74260, "PCT Written Opinion of the International Searching Authority," dated Nov. 13, 2008, 6 pgs.
Form PCT/ISA/237, For PCT/US08/83254, "PCT Written Opinion of the International Searching Authority," dated Jan. 14, 2009, 7 pgs.
Examination Report Under Section 18(3) re UK patent application No. GB0724760.4 dated Jan. 30, 2008, 3 pages.
Examination Report Under Section 18(3) re UK patent application No. GB0724248.0 dated Jan. 30, 2008, 3 pages.
Examination Report Under Section 18(3) re UK patent application No. GB0724248.0 dated Jun. 4, 2008, 2 pages.
Examination Report Under Section 18(3) re UK patent application No. GB0800040.8 dated Jan. 30, 2008, 3 pages.
Examination Report Under Section 18(3) re UK patent application No. GB0620362.4 dated Aug. 13, 2007, 5 pages.
Alarm.com—Interactive Security Systems, Elders, printed from website Nov. 4, 2003, 1 page.
Alarm.com—Interactive Security Systems, Frequently Asked Questions, printed from website Nov. 4, 2003, 3 pages.
Alarm.com—Interactive Security Systems, Overview, printed from website Nov. 4, 2003, 2 pages.
Alarm.com—Interactive Security Systems, Product Advantages, printed from website Nov. 4, 2003, 3 pages.
X10—ActiveHome, Home Automation Made Easy!, printed from website Nov. 4, 2003, 3 pages.

* cited by examiner

POWER AND DATA SOLUTION FOR REMOTE LOW-POWER DEVICES

RELATED APPLICATIONS

This application is a continuation of U.S. patent application Ser. No. 13/099,293, filed May 2, 2011, now U.S. Pat. No. 9,144,143.

TECHNICAL FIELD

The present invention relates to flexible power and data interfaces for low-power outdoor devices such as cameras. More particularly, it relates to apparatus that enables such devices to be powered, and optionally network-connected, using simple landscape lighting wiring and equipment.

BACKGROUND

Typical low voltage outdoor devices are either battery-powered or require a 110/220 Volt alternating current (AC) wall outlet to enable an external or internal power supply to generate the necessary voltage(s) for the device. However, battery life is always limited with these devices and requires the user to change batteries on a periodic basis, creating a major inconvenience as well as potential risks (e.g. battery runs out and there is no one around to replace it, rendering the device useless the batteries are replaced). Furthermore, outside wall sockets for a typical home are usually very limited in number compared to indoor outlets, and this either prevents the installation of the device in the desired location or requires the use of long and/or unsightly extension cords. Outdoor extension cords also present a danger when used as a component of a permanent installation.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments described include a system comprising a voltage transformer connected to a power source. The voltage transformer transforms a high voltage of the power source to a first low voltage signal. Regulators are connected to the voltage transformer, and the regulators receive the first low voltage signal from the voltage transformer and convert the first low voltage signal to a second low voltage signal. A remote device is connected to each of the regulators. The remote device is powered by the second low voltage signal from the regulator to which it is connected. The remote devices include, for example, security system components and/or network components like those described in the Related Applications.

Embodiments herein also include a method comprising transforming a high voltage of a power source to a first low voltage signal. The first low voltage signal is distributed to nodes via a first wired connection. The first low voltage signal is converted to a second low voltage signal at each of the nodes. The method distributes the second low voltage signal of a node to a remote device connected to the node via a second wired connection. The second low voltage signal powers the remote device. The remote devices include, for example, security system components and/or network components like those described in the Related Applications.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
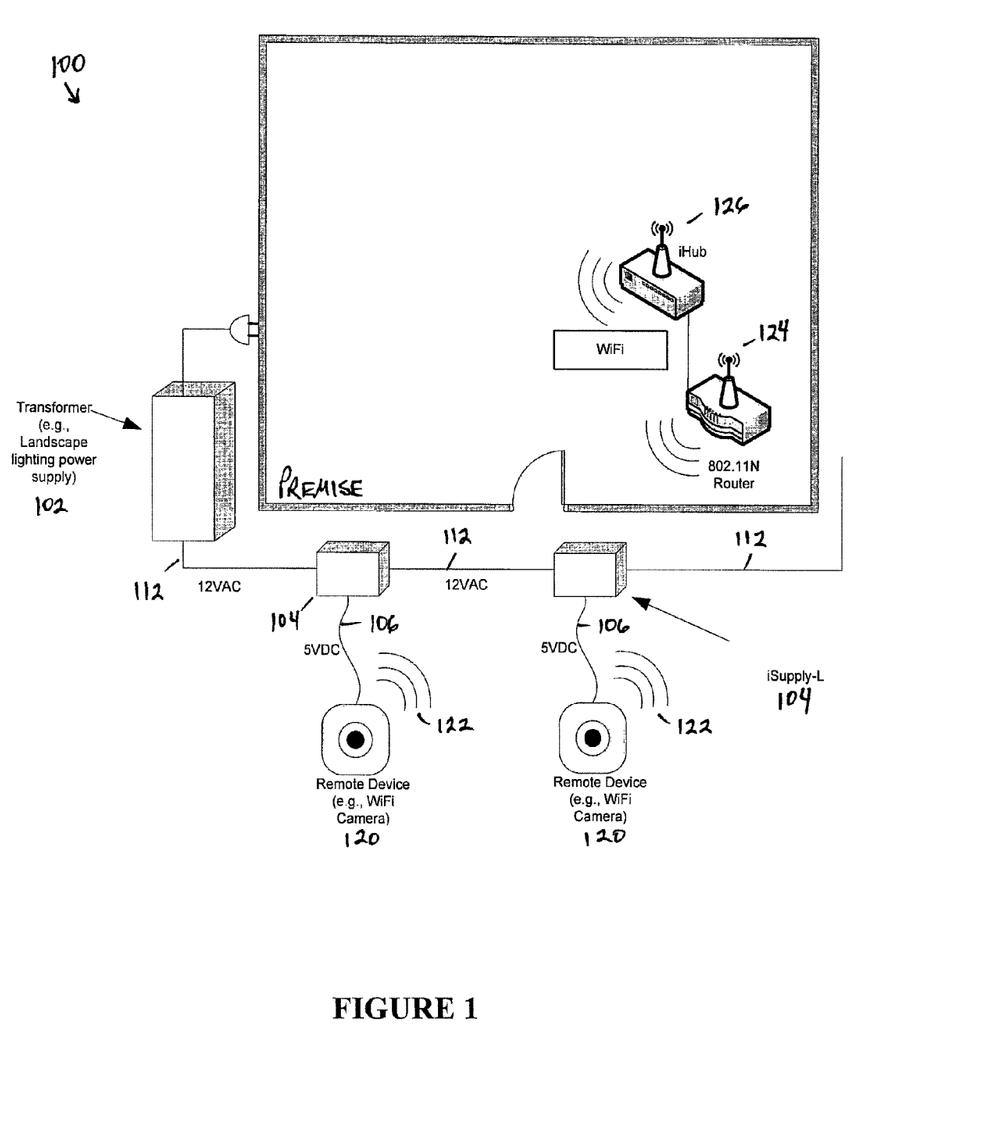
FIG. 1 is a block diagram for a Remote Power Solution (RPS), under an embodiment.

FIG. 1 is a block diagram for a Remote Power Solution (RPS) 100, under an embodiment. In this configuration the RPS 100 provides power to remote devices 120 using at least one transformer 102. The remote devices 120 of an embodiment include remote security components or devices that require power for operation. For example, the remote security components 120 include one or more of remote security cameras, also referred to as outdoor cameras, or other security sensors or devices as described in the Related Applications (e.g., Internet Protocol (IP) devices, sensors, input/output (I/O) devices, etc.).

The transformer 102 of an embodiment includes a low-voltage transformer, for example a low-voltage landscape lighting transformer that provides power to connected devices using a low-voltage cable 112. One or more remote devices 120 connect to the low-voltage cable 112 through a regulator unit, referred to as the iSupply-L 104. The transformer converts a high-voltage transformer input signal to a low-voltage output signal, and the iSupply-L regulator 104 of an embodiment converts the low-voltage output of the transformer 102 to a voltage appropriate for the remote device 120. The remote devices 120, once powered, operate as designed, and in the case of the cameras shown, communicate over a radio frequency (RF) protocol 122 (e.g., 802.11 (WiFi)) to a router 124 and/or home gateway 126.

The iSupply-L regulator 104 of an embodiment is coupled or connected to an output of the transformer 102. The iSupply-L regulator 104 converts the output of the transformer 102 to a voltage type and level appropriate to the power specification of the corresponding remote device 120. As an example, the iSupply-L regulator 104 converts the 12 Volts alternating current (AC) (VAC) output signal of the transformer 102 of an embodiment to a 5 Volt direct current (DC) (VDC) signal that couples or connects to the remote device 120 (e.g., WiFi camera). An embodiment includes one iSupply-L regulator 104 for each remote device 120. An alternative embodiment can use one iSupply-L regulator 104 to provide power for more than one remote device 120.

Figure 2:
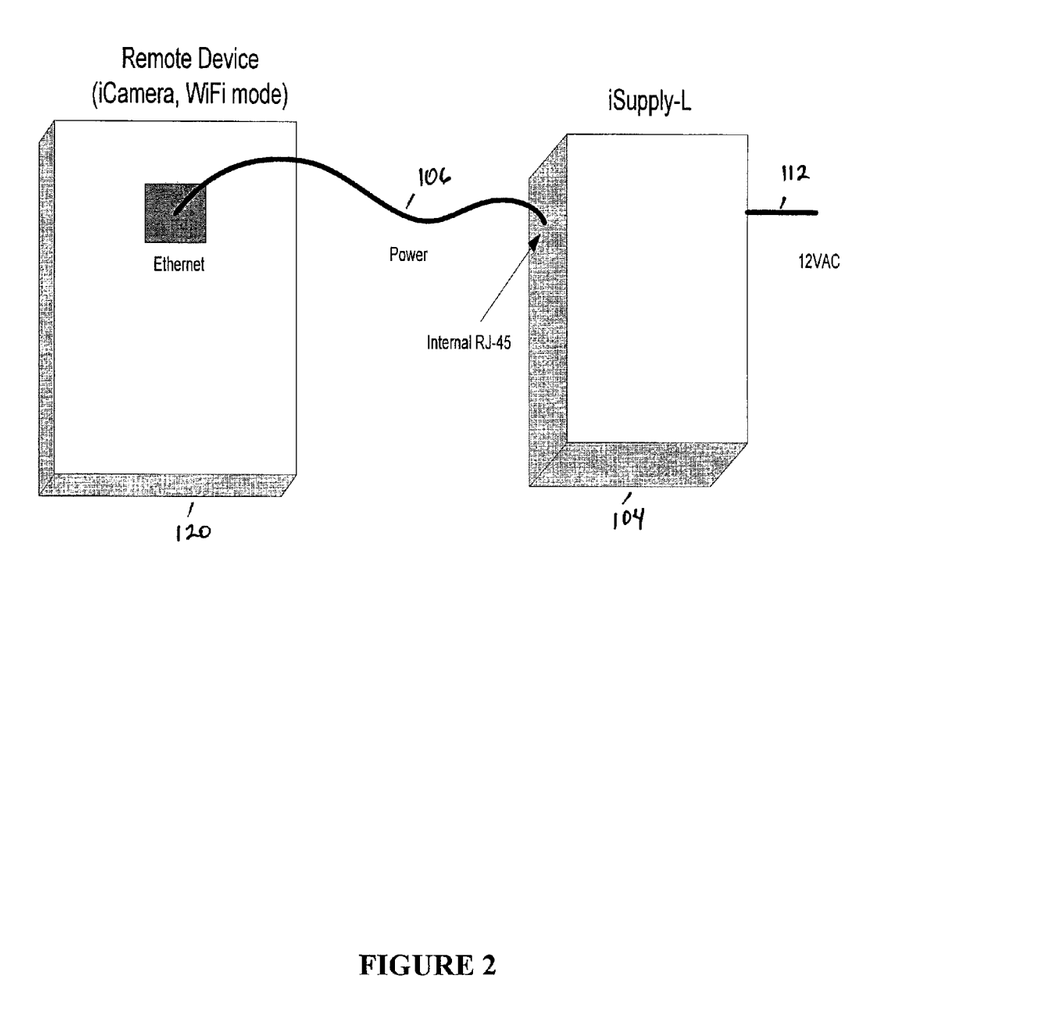
FIG. 2 shows the connection of a remote device to the iSupply-L voltage regulator, under an embodiment.

FIG. 2 shows the connection 106 of a remote device 120 to the iSupply-L regulator 104, under an embodiment. In this example, a Category 5 cable (Cat 5) 106 is used to connect the iSupply-L regulator 104 to the remote devices 120. The Cat 5 cable 106 comprises a twisted pair high signal integrity cable type used in structured cabling for computer networks. Alternative embodiments, however, are not limited to the use of Cat 5 cabling and can use any cable that matches the power requirements of the remote device (e.g. USB, 4-wire security cable, etc). The connection of the iSupply-L regulator 104 to the Cat 5 cable 106 is sealed to provide adequate waterproofing for the outdoor environment.

Using the low-voltage lighting transformer as an example, components of a conventional outdoor lighting system for illuminating outdoor landscaping supply power to the RPS of an embodiment. The outdoor lighting system typically comprises a light housing containing a light source connected to the end of an elongated support. A spike shaped stake is connected to the other end of the elongated support allowing the outdoor lighting to be staked into the ground around the landscaping that is desired to be illuminated. Outdoor lighting may be powered by conventional alternating current (AC) or direct current (DC) sources via a transformer having a low-voltage output to reduce the hazards of inadvertent electrical shock. The electrical current is provided by means of a two-conductor wiring cable (low-voltage cable) that is buried alongside each of the lighting units. One end of the wiring cable is connected to the low-voltage transformer, which may be operatively controlled by means of a timer or light-sensing device, to turn on the lights only during nighttime. The transformer is powered by conventional household current (e.g., 110 VAC). The remote devices of an embodiment can be positioned anywhere throughout the landscaping as desired and connected to the wiring cable by means of the iSupply-L regulator. Power to the remote devices is provided by leads connected to the iSupply-L regulator, and the iSupply-L regulators are connected in parallel to the wiring cable.

The transformers of an embodiment are electrical devices that utilize a primary and secondary winding to provide an output potential from the secondary winding that is lower than the potential of a power source coupled or connected to the primary winding. An example application of such transformers is in landscape lighting systems, which include low-voltage landscape lighting fixtures. In landscape lighting applications, the primary winding of a lighting transformer is coupled or connected to a 110 VAC power source and the secondary winding is connected to one or more runs of 12 VAC landscape lighting fixtures.

The landscape lighting transformer of an embodiment includes multiple taps that provide a range of output voltages for different wire runs that require different voltages (e.g., higher, or lower) to compensate for power losses through the wire runs as a result of excessive wire lengths or to accommodate different types of devices. In such cases, the transformer includes output terminals corresponding to a range of voltages such as, for example, from 5V to 18V. The secondary winding of the transformer includes one or more circuit-breakers or fuses that protect the transformer from overload or damage.

More specifically, the transformer of an embodiment includes a primary winding or coil, a core, and a secondary winding or coil. The core is formed of EI, ferrous, core metal laminates or can be toroidal. A toroidal transformer core is formed using a tape-wound strip of electrical steel. The primary and secondary windings are threaded through a central opening in the toroidal core and distributed evenly along the circumference of the core. A high voltage (e.g., 110 VAC) is applied to the primary winding, and the secondary winding is inductively coupled to the primary winding such that a lower voltage proportional to the number of windings is set up in the secondary winding. The transformer comprises one or more standard output taps coupled to the secondary winding for tapping a desired voltage, e.g., 5V, 6V, 12V, 14V, etc.

Additionally, the secondary winding of an embodiment includes a common tap corresponding to 300 W of power capacity for returning current back to the secondary winding. The common taps of the transformer of an embodiment are provided in multiples of 300 W of power capacity, but are not so limited. Thus, a 300 W transformer includes one standard common tap, a 600 W transformer includes two standard common taps, a 900 W transformer includes three standard common taps, a 1200 W transformer includes four standard common taps, and a 1500 W transformer includes five standard common taps, for example. Each 300 W common tap is protected by a circuit breaker, fuse, or any other type of device that can clear a short or overload.

Figure 3:
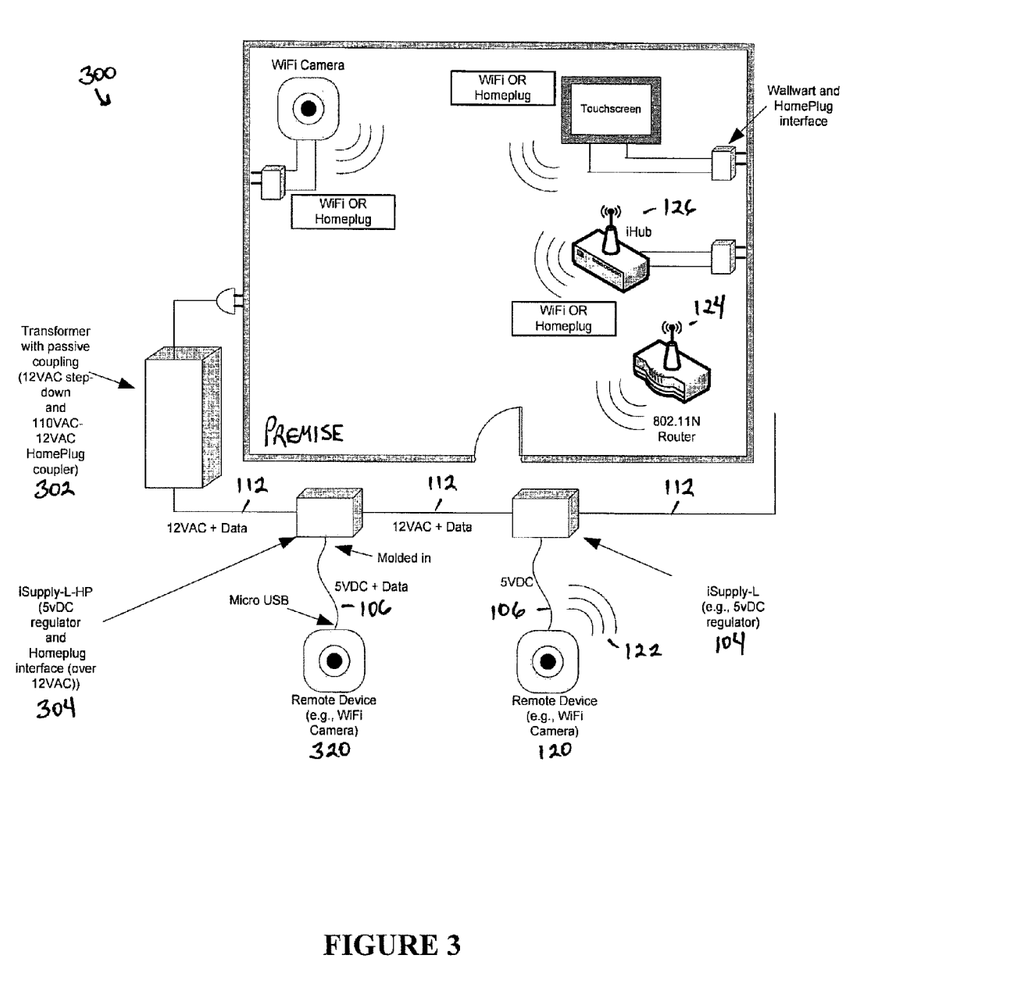
FIG. 3 is a block diagram for a Remote Power Solution (RPS) comprising an alternate data communication path for the powered device, under an alternative embodiment.

As described above, the remote devices operate to communicate over a radio frequency (RF) protocol (e.g., 802.11 (WiFi)) to a router or home gateway, or other remote components in the premise environment (e.g., indoor and/or outdoor environment). However, in some situations or installations, wireless routing of signals may not be possible. FIG. 3 is a block diagram for a Remote Power Solution (RPS) 300 comprising an alternate data communication path for the powered device, under an alternative embodiment. In this embodiment the RPS 300 supports an alternate communication path to the RF link for the remote devices should the devices require such data connectivity. In the case where the RPS 300 is also used for data/network connectivity for the low-voltage device, the additional communication path provides an alternative for when the RF communication link for the remote device (e.g., WiFi) is unreliable or unavailable.

In this embodiment, the transformer 302, referred to as the iTransformer 302, comprises a low-voltage transformer integrated with a passive coupling circuit for transferring power-line communication signals (in this case HomePlug AV) between the primary and secondary sides (e.g., 110 VAC (primary) and 12 VAC (secondary) sides) of the transformer. The transformer portion of the iTransformer 302 includes a low-voltage transformer, for example a low-voltage landscape lighting transformer that provides power to connected devices using a low-voltage cable 112. One or more remote devices 120/320 connect to the low-voltage cable 112 through a regulator unit 104/304. The transformer converts a high-voltage transformer input signal to a low-voltage output signal, and the regulator 104/304 of an embodiment converts the low-voltage output of the transformer to a voltage appropriate for the remote device 120/320. The remote devices 120/320, once powered, operate as designed, and in the case of the cameras shown, communicate over a radio frequency (RF) protocol 122 (e.g., 802.11 (WiFi)) and/or a wired link to a router 124 and/or home gateway 126.

When the remote device 120 is an RF device capable of communicating with remote components via an RF protocol, then the remote device 120 connects to the low-voltage cable 112 through the iSupply-L regulator 104. The iSupply-L regulator 104 of an embodiment is connected to an output of the iTransformer 302. The iSupply-L regulator 104 converts the output of the iTransformer 302 to a voltage type and level appropriate to the power specification of the corresponding remote device 120. As an example, the iSupply-L regulator 104 converts the 12 VAC output of the iTransformer 302 of an embodiment to a 5 VDC signal that couples or connects to the remote device 120 (e.g., WiFi camera). The remote devices 120, once powered, operate as designed, and in the case of the cameras shown, communicate over the RF protocol 122 (e.g., 802.11 (WiFi)) to a router 124 and/or home gateway 126.

When the remote device 320 is not capable of communicating with remote components via an RF protocol, then the remote device 320 connects to the low-voltage cable 112 through the iSupply-L-HP regulator 304. The iSupply-L-HP regulator 304, as an alternative embodiment of the iSupply-L regulator described above, provides communication components for transferring data from the remote device 320 to the iTransformer 302 in addition to the power regulation capability. Therefore, the iSupply-L-HP regulator 304 of an embodiment converts the 12 VAC of the low-voltage transformer 302 to a voltage appropriate for the remote device 320 and, additionally, transfers data between the low-voltage cable 112 that connects to the iTransformer 302 and the cable 112 (e.g., Cat 5) that connects the iSupply-L-HP regulator 304 to the remote device 320. Thus, data and other information are communicated to and from the remote device 320 via a wired link comprising the passive coupling circuit of the iTransformer 302, the wired connection 112 between the iTransformer 302 and the iSupply-L-HP regulator 304, and the wired connection 106 between the iSupply-L-HP regulator 304 and the corresponding remote device 320. As described above, the wired link of an embodiment comprises the low-voltage cable 112 connecting the iTransformer 302 and the iSupply-L-HP regulator 304, and the cable 106 (e.g., Cat 5) connecting the iSupply-L-HP regulator 304 to the corresponding remote device 320. Therefore, when RF communication is not possible (e.g., due to interference, signal degradation, etc.) the wired link 112/106 provides a data communication path between the remote device 320 and other components or devices 124/126 of the premise environment (e.g., indoor and/or outdoor environment). Any number and/or combination of iSupply-L 104 and iSupply-L-HP 304 regulators can be used in combination with the iTransformer 302 of an embodiment.

Figure 4:
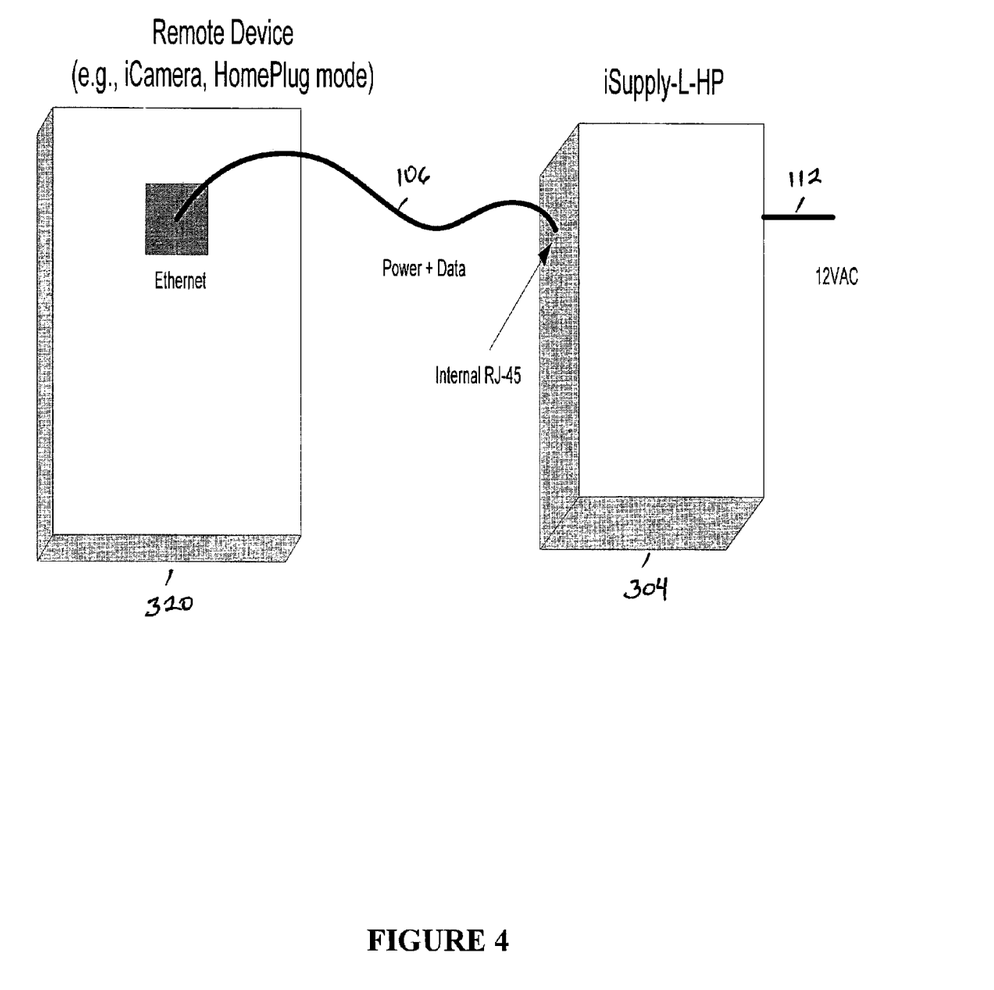
FIG. 4 shows the connection of a remote device to the iSupply-L-HP voltage regulator, under an alternative embodiment.

FIG. 4 shows the connection 106 of a remote device 320 to the iSupply-L-HP regulator 304, under an embodiment. In this example, a Category 5 cable (Cat 5) 106 is used to connect the iSupply-L-HP regulator 304 to the remote devices 320 to provide power to the remote device as well as to provide a data path over which the remote device 320 and other components or devices 124/126 of the premise environment (e.g., indoor and/or outdoor environment) communicate. The Cat 5 cable 106 comprises a twisted pair high signal integrity cable type used in structured cabling for computer networks. Alternative embodiments, however, are not limited to the use of Cat 5 cabling and can use any cable that matches the power requirements of the remote device (e.g. USB, 4-wire security cable, etc). The connection of the iSupply-L-HP regulator 304 to the Cat 5 cable 106 is sealed to provide adequate waterproofing for the outdoor environment.

Embodiments described herein include a system comprising a voltage transformer connected to a power source. The voltage transformer transforms a high voltage of the power source to a first low voltage signal. The system comprises a plurality of regulators connected to the voltage transformer. The plurality of regulators receives the first low voltage signal from the voltage transformer and converts the first low voltage signal to a second low voltage signal. The system comprises a remote device connected to each of the plurality of regulators. The remote device is powered by the second low voltage signal from the regulator to which it is connected.

Embodiments described herein include a system comprising: a voltage transformer connected to a power source, wherein the voltage transformer transforms a high voltage of the power source to a first low voltage signal; a plurality of regulators connected to the voltage transformer, wherein the plurality of regulators receives the first low voltage signal from the voltage transformer and converts the first low voltage signal to a second low voltage signal; and a remote device connected to each of the plurality of regulators, wherein the remote device is powered by the second low voltage signal from the regulator to which it is connected.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The voltage transformer of an embodiment comprises a passive coupling circuit for transferring power-line communication signals.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via a radio frequency link.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

The high voltage of an embodiment is approximately 110 volts alternating current.

The first low voltage signal of an embodiment is approximately 12 volts alternating current.

The second low voltage signal of an embodiment is approximately 5 volts direct current.

Embodiments described herein include a system comprising a plurality of regulators. Each regulator of the plurality of regulators is connected to a voltage transformer via a low-voltage cable and receives a first low voltage signal from the voltage transformer and converts the first low voltage signal to a second low voltage signal. The system comprises a remote device connected to each of the plurality of regulators. The remote device is powered by the second low voltage signal from the regulator to which it is connected.

Embodiments described herein include a system comprising: a plurality of regulators, wherein each regulator of the plurality of regulators is connected to a voltage transformer via a low-voltage cable and receives a first low voltage signal from the voltage transformer and converts the first low voltage signal to a second low voltage signal; and a remote device connected to each of the plurality of regulators, wherein the remote device is powered by the second low voltage signal from the regulator to which it is connected.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The voltage transformer of an embodiment is connected to a power source, wherein the voltage transformer transforms a high voltage of the power source to the first low voltage signal.

The high voltage of an embodiment is approximately 110 volts alternating current.

The first low voltage signal of an embodiment is approximately 12 volts alternating current.

The second low voltage signal of an embodiment is approximately 5 volts direct current.

The voltage transformer of an embodiment comprises a passive coupling circuit for transferring power-line communication signals.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via a radio frequency link.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

Embodiments described herein include a system comprising a device comprising a voltage transformer and a passive coupling circuit. The voltage transformer is connected to a power source and transforms a high voltage of the power source to a first low voltage signal. The passive coupling circuit transfers power-line communication signals. The system comprises a plurality of regulators connected to the device. Each regulator of the plurality of regulators receives the first low voltage signal from the device and converts the first low voltage signal to a second low voltage signal. The system comprises a remote device connected to each of the plurality of regulators. The remote device is powered by the second low voltage signal from the regulator to which it is connected. The remote device exchanges data with a plurality of remote components via a wired link comprising the regulator and the passive coupling circuit.

Embodiments described herein include a system comprising: a device comprising a voltage transformer and a passive coupling circuit, wherein the voltage transformer is connected to a power source and transforms a high voltage of the power source to a first low voltage signal, wherein the passive coupling circuit transfers power-line communication signals; a plurality of regulators connected to the device, wherein each regulator of the plurality of regulators receives the first low voltage signal from the device and converts the first low voltage signal to a second low voltage signal; and a remote device connected to each of the plurality of regulators, wherein the remote device is powered by the second low voltage signal from the regulator to which it is connected, wherein the remote device exchanges data with a plurality of remote components via a wired link comprising the regulator and the passive coupling circuit.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

The high voltage of an embodiment is approximately 110 volts alternating current.

The first low voltage signal of an embodiment is approximately 12 volts alternating current.

The second low voltage signal of an embodiment is approximately 5 volts direct current.

Embodiments described herein include a method comprising transforming a high voltage of a power source to a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection, wherein the second low voltage signal powers the remote device.

Embodiments described herein include a method comprising: transforming a high voltage of a power source to a first low voltage signal; distributing the first low voltage signal to a plurality of nodes via a first wired connection; converting the first low voltage signal to a second low voltage signal at each node of the plurality of nodes; and distributing the second low voltage signal of a node to a remote device connected to the node via a second wired connection, wherein the second low voltage signal powers the remote device.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link.

The method of an embodiment comprises transferring power-line communication signals from the remote device using a passive coupling circuit.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via a radio frequency link.

The method of an embodiment comprises the remote device communicating with the plurality of security system components via at least one of a radio frequency link and a wired link comprising the passive coupling circuit, the first wired connection and the second wired connection.

The remote device is an Internet Protocol (IP) device.

The remote device is a camera.

The remote device is a sensor.

The remote device is an input/output (I/O) device.

The first wired connection is a low-voltage cable and the second wired connection is a Category 5 cable.

The high voltage is approximately 110 volts alternating current.

The first low voltage signal is approximately 12 volts alternating current.

The second low voltage signal is approximately 5 volts direct current.

Embodiments described herein include a method comprising receiving a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection. The second low voltage signal powers the remote device.

Embodiments described herein include a method comprising: receiving a first low voltage signal; distributing the first low voltage signal to a plurality of nodes via a first wired connection; converting the first low voltage signal to a second low voltage signal at each node of the plurality of nodes; and distributing the second low voltage signal of a node to a remote device connected to the node via a second wired connection, wherein the second low voltage signal powers the remote device.

The method of an embodiment comprises transforming a high voltage of a power source to generate the first low voltage signal.

The high voltage of an embodiment is approximately 110 volts alternating current. The first low voltage signal of an embodiment is approximately 12 volts alternating current.

The second low voltage signal of an embodiment is approximately 5 volts direct current.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link. The method of an embodiment comprises transferring power-line communication signals from the remote device using a passive coupling circuit.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via a radio frequency link.

The method of an embodiment comprises the remote device communicating with the plurality of security system components via at least one of a radio frequency link and a wired link comprising the passive coupling circuit, the first wired connection and the second wired connection.

The remote device of an embodiment is an Internet Protocol (IP) device.

The remote device of an embodiment is a camera.

The remote device of an embodiment is a sensor.

The remote device of an embodiment is an input/output (I/O) device.

The first wired connection of an embodiment is a low-voltage cable and the second wired connection is a Category 5 cable.

Embodiments described herein include a method comprising transforming a high voltage of a power source to a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection. The second low voltage signal powers the remote device. The method comprises communicating data between the remote device and a plurality of remote components via a passive coupling circuit and the plurality of nodes.

Embodiments described herein include a method comprising: transforming a high voltage of a power source to a first low voltage signal; distributing the first low voltage signal to a plurality of nodes via a first wired connection; converting the first low voltage signal to a second low voltage signal at each node of the plurality of nodes; distributing the second low voltage signal of a node to a remote device connected to the node via a second wired connection, wherein the second low voltage signal powers the remote device; and communicating data between the remote device and a plurality of remote components via a passive coupling circuit and the plurality of nodes.

The method of an embodiment comprises transforming a high voltage of a power source to generate the first low voltage signal.

The high voltage of an embodiment is approximately 110 volts alternating current.

The first low voltage signal of an embodiment is approximately 12 volts alternating current.

The second low voltage signal of an embodiment is approximately 5 volts direct current.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via at least one of a radio frequency link and a wired link comprising the passive coupling circuit, the first wired connection and the second wired connection.

The remote device of an embodiment is an Internet Protocol (IP) device.

The remote device of an embodiment is a camera.

The remote device of an embodiment is a sensor.

The remote device of an embodiment is an input/output (I/O) device.

The first wired connection of an embodiment is a low-voltage cable and the second wired connection is a Category 5 cable.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other systems and methods, not only for the systems and methods described above.

The elements and acts of the various embodiments described above can be combined to provide further embodiments. These and other changes can be made to the embodiments in light of the above detailed description.

What is claimed is:

1. An apparatus comprising:
 a device interface configured to communicate with a user device and receive an indication of a power requirement of the user device; and
 a transformer configured to:
 receive a first signal having a first voltage; and
 output, based on the power requirement of the user device, a second signal having a second voltage different from the first voltage.

2. The apparatus of claim 1, wherein the user device comprises a premises management device.

3. The apparatus of claim 2, wherein the user device comprises at least one of a camera, a sensor, or a lighting device.

4. A device comprising:
 a processor; and
 memory storing instructions that, when executed on the processor, cause the device to:
 receive, from a user device, an indication of a power requirement of the user device;
 receive a first signal having a first voltage; and
 output, based on the power requirement of the user device, a second signal having a second voltage different from the first voltage.

5. The device of claim 4, wherein the power requirement of the user device comprises a voltage and a current.

6. The device of claim 4, wherein the second voltage is less than the first voltage.

7. An apparatus comprising:
a device interface configured to communicate with a plurality of user devices and receive an indication of power requirements of the plurality of user devices; and
a transformer configured to receive a first signal having an initial voltage and output, based on the power requirements, a plurality of signals, wherein each of the plurality of signals has a voltage different from the initial voltage.

8. The apparatus of claim 7, wherein the device interface is configured to communicate with the user device via at least one of a wired link or a radio frequency.

9. The apparatus of claim 7, wherein the device interface is configured to control communications between the user device and another user device.

10. The apparatus of claim 7, wherein the first signal has a first current type and at least one of the plurality of signals has a second current type different from the first current type.

11. The apparatus of claim 7, further comprising a plurality of output terminals; and
wherein the transformer is configured to output, via the plurality of output terminals, the plurality of signals.

12. The apparatus of claim 11, wherein the transformer is configured to output, via each of the plurality of output terminals, one of the plurality of signals.

13. A method comprising:
receiving an indication of a power requirement of a user device;
receiving a first signal having a first voltage; and
outputting, based on the power requirement of the user device, a second signal having a second voltage different from the first voltage.

14. The method of claim 13, further comprising:
receiving, from the user device, data; and
causing transmission of the data to another user device.

15. The method of claim 13, wherein the outputting the second signal comprises outputting, to the user device and via a wired coupling, the second signal.

16. A method comprising:
receiving an indication of a power requirement of a user device;
receiving a first signal having a first electrical characteristic; and
outputting, based on the power requirement of the user device, a second signal having a second electrical characteristic
different from the first electrical characteristic.

17. The method of claim 16, wherein the first electrical characteristic and the second electrical characteristic each comprise a voltage.

18. The method of claim 16, wherein the first electrical characteristic and the second electrical characteristic each comprise one of alternating current (AC) or direct current (DC).

19. A method comprising:
receiving an indication of power requirements of a plurality of user devices;
receiving a first signal having an initial voltage; and
outputting, based on the power requirements of the plurality of user devices, a plurality of signals, at least one of the plurality of signals having a voltage different from the initial voltage.

20. The method of claim 19, wherein the outputting the plurality of signals comprises outputting, via a wired connection with the plurality of user devices, the plurality of signals.

21. The method of claim 19, further comprising causing transmission of data to at least one of the plurality of user devices, wherein the data is received from another of the plurality of user devices.

* * * * *